US012662989B2

(12) United States Patent (10) Patent No.: US 12,662,989 B2

Lutkiewicz (45) Date of Patent: Jun. 23, 2026

(54) FLANGE CONNECTION

(71) Applicant: Freudenberg Flow Technologies LLC, Houston, TX (US)

(72) Inventor: Przemyslaw Lutkiewicz, Drammen (NO)

(73) Assignee: Freudenberg Flow Technologies LLC, Houston, TX (US)

( * ) Notice: Subject to any disclaimer, the term of this patent is extended or adjusted under 35 U.S.C. 154(b) by 908 days.

(21) Appl. No.: 17/562,255

(22) Filed: Dec. 27, 2021

(65) Prior Publication Data

US 2023/0204058 A1 Jun. 29, 2023

(51) Int. Cl.
| | |
|---|---|
| *F16B 7/18* | (2006.01) |
| *E04H 12/08* | (2006.01) |
| *F03D 13/20* | (2016.01) |

(52) U.S. Cl.
CPC ......... *F03D 13/205* (2023.08); *E04H 12/085* (2013.01); *F16B 7/18* (2013.01); *F16B 2200/506* (2018.08)

(58) Field of Classification Search
CPC ........ F03D 13/205; F03D 13/206; F16B 7/18; F16B 7/182; F16B 2200/506; Y10T 403/64; Y10T 403/645; F16L 23/026; F16L 23/032; F16L 23/22; E04H 12/085
USPC .................................. 403/335, 337
See application file for complete search history.

(56) References Cited

U.S. PATENT DOCUMENTS

| | | | | | |
|---|---|---|---|---|---|
| 1,873,793 | A | * | 8/1932 | Snelling | C01B 21/46 203/81 |
| 1,873,855 | A | * | 8/1932 | Wilson | F16L 23/20 285/341 |
| 2,274,439 | A | * | 2/1942 | Tinker | F16L 23/02 285/331 |
| 2,739,828 | A | * | 3/1956 | Schindler | F16L 23/12 285/422 |

(Continued)

FOREIGN PATENT DOCUMENTS

| | | | | |
|---|---|---|---|---|
| DE | 1018681 | B | * 10/1957 | ............ F16L 23/026 |
| DE | 10152018 | A1 | 4/2003 | |

(Continued)

OTHER PUBLICATIONS

Extended European Search Report dated May 8, 2023 (corresponding to EP 22213153.4).

*Primary Examiner* — Amber R Anderson
*Assistant Examiner* — Kevin J Baynes
(74) *Attorney, Agent, or Firm* — Harness, Dickey & Pierce, PLC

(57) ABSTRACT

A flange connection system, including a pair of flange rings each including a neck portion and a radially extending flange portion. The radially extending flange portion includes a distal face including a contact surface that protrudes from a remainder of the distal face. The radially extending flange portion includes a plurality of circumferentially spaced bolt holes extending parallel to a center axis. The distal face including a first seal pocket radially inward of the contact surface and a second seal pocket radially outward of the contact surface, wherein in an assembled condition, the contact surface of the first flange ring is disposed against the contact surface of the second flange ring, a first seal ring is disposed in the first seal pockets, and a second seal ring is disposed in the second seal pockets.

7 Claims, 3 Drawing Sheets

(56)                References Cited

U.S. PATENT DOCUMENTS

| | | | | |
|---|---|---|---|---|
| 3,339,950 | A * | 9/1967 | Grove | F16L 23/22 |
| | | | | 285/363 |
| 3,820,830 | A * | 6/1974 | Dryer | F16L 23/22 |
| | | | | 277/614 |
| 4,019,371 | A * | 4/1977 | Chaplin | F16L 23/167 |
| | | | | 73/49.8 |
| 4,288,105 | A * | 9/1981 | Press | F16L 23/12 |
| | | | | 285/55 |
| 4,403,795 | A * | 9/1983 | Davlin | F16L 27/06 |
| | | | | 285/334.4 |
| 4,410,186 | A * | 10/1983 | Pierce, Jr. | F16L 23/167 |
| | | | | 277/318 |
| 4,428,603 | A * | 1/1984 | Davlin | F16L 23/16 |
| | | | | 285/368 |
| 5,230,540 | A * | 7/1993 | Lewis | F16L 23/162 |
| | | | | 285/368 |
| 5,938,246 | A * | 8/1999 | Wallace | F16L 23/18 |
| | | | | 285/906 |
| 6,394,507 | B1 | 5/2002 | Baker | |
| 6,722,707 | B1 * | 4/2004 | Schurmann | F16L 23/032 |
| | | | | 285/414 |
| 7,096,639 | B2 | 8/2006 | Wobben | |
| 8,313,264 | B2 * | 11/2012 | Webjorn | F16L 23/032 |
| | | | | 285/368 |
| 8,490,337 | B2 | 7/2013 | Word, III et al. | |
| 8,794,637 | B2 * | 8/2014 | Martin | F16L 23/18 |
| | | | | 277/645 |
| 9,200,520 | B2 * | 12/2015 | Lecuyer | F16D 1/033 |
| 9,726,313 | B2 * | 8/2017 | Haringstad | F16L 23/22 |
| 10,415,729 | B2 * | 9/2019 | Stobbart | F16L 23/20 |
| 11,137,093 | B2 * | 10/2021 | Mcgilvray, Jr. | F16L 23/12 |
| 11,300,236 | B2 * | 4/2022 | Liszkai | G21C 13/063 |
| 11,598,456 | B1 * | 3/2023 | Nazari | F16L 23/024 |
| 11,873,793 | B2 * | 1/2024 | Lassesen | F03D 13/20 |
| 11,976,754 | B2 * | 5/2024 | Bial | F16L 23/20 |
| 2007/0102926 | A1 * | 5/2007 | Magnier | F16L 23/032 |
| | | | | 285/368 |
| 2008/0030869 | A1 | 2/2008 | Shafer et al. | |
| 2009/0115188 | A1 * | 5/2009 | Howard | F16L 23/032 |
| | | | | 285/332 |
| 2010/0295298 | A1 * | 11/2010 | Haumont | F16J 15/04 |
| | | | | 285/412 |
| 2010/0307097 | A1 | 12/2010 | Word, III et al. | |
| 2011/0135492 | A1 * | 6/2011 | Tetambe | E04H 12/085 |
| | | | | 52/655.1 |
| 2015/0068150 | A1 | 3/2015 | Mathiasen | |
| 2017/0314715 | A1 * | 11/2017 | Schmalzbauer | F16L 23/24 |
| 2020/0191679 | A1 * | 6/2020 | Wang | F16L 23/032 |

FOREIGN PATENT DOCUMENTS

| | | | | | |
|---|---|---|---|---|---|
| DE | 102014001996 | A1 | | 6/2015 | |
| EP | 1965117 | A1 * | | 9/2008 | F16L 17/06 |
| FR | 2921144 | A1 * | | 3/2009 | F16L 23/032 |
| GB | 2200179 | A | * | 7/1988 | F16L 23/032 |
| NO | 177160 | C | * | 7/1995 | F16L 23/032 |
| SE | 524724 | C2 | * | 9/2004 | F16L 23/032 |
| WO | WO-8504939 | A1 * | | 11/1985 | F16L 23/036 |
| WO | WO-9317268 | A1 * | | 9/1993 | F16L 23/032 |
| WO | 2010144500 | A1 | | 12/2010 | |
| WO | 2013097865 | A1 | | 7/2013 | |
| WO | 2020/089020 | A1 | | 5/2020 | |

* cited by examiner

FLANGE CONNECTION

FIELD

The present disclosure relates to a flange connection for wind tower sections and the like.

BACKGROUND

This section provides background information related to the present disclosure which is not necessarily prior art.

Wind towers experience high cycling loads, especially bending moments for the wind tower flanges. Existing flanges have fatigue sensitive bolts and flanges.

L-type flanges which are common in use have high displacement opening which can be a challenge if an additional sealing system (for example elastomer seal rings/gaskets) is needed to be implemented to protect against environmental conditions.

SUMMARY

This section provides a general summary of the disclosure, and is not a comprehensive disclosure of its full scope or all of its features.

A flange connection system, includes a pair of flange rings each including a neck portion and a radially extending flange portion. The radially extending flange portion includes a distal face including a contact surface that protrudes from a remainder of the distal face. The radially extending flange portion includes a plurality of circumferentially spaced bolt holes extending parallel to a center axis. The distal face including a first seal pocket radially inward of the contact surface and a second seal pocket radially outward of the contact surface. In an assembled condition, the contact surface of the first flange ring is disposed against the contact surface of the second flange ring, a first seal ring is disposed in the first seal pockets, and a second seal ring is disposed in the second seal pockets between the pair of flange rings.

The flange connection is provided primarily for wind tower structural connections. The design uses self-energized flange ring (by warping) controlled by the flange step to gain a proper contact forces profile on the flange face. The proper contact force profile on the flange face creates a static behavior of the flange for high bending moment loads which is desirable for wind tower connections. Combining the static behavior with elliptical (or other high order type) transition from flange ring to the flange neck will give connection with high fatigue resistance. Due to high contact pressure at the flange step, the connection can seal itself with or without additional sealing element. The flange itself can however support an additional seal for better protection against environmental conditions.

The bolted static connection includes two flanges where the bolt loads are transferred through metal to metal contact between the flange contact surfaces. When the bending forces and tensile loads are applied to the flange connection, the flange connection will not become loose and weakened. It will remain a static connection.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
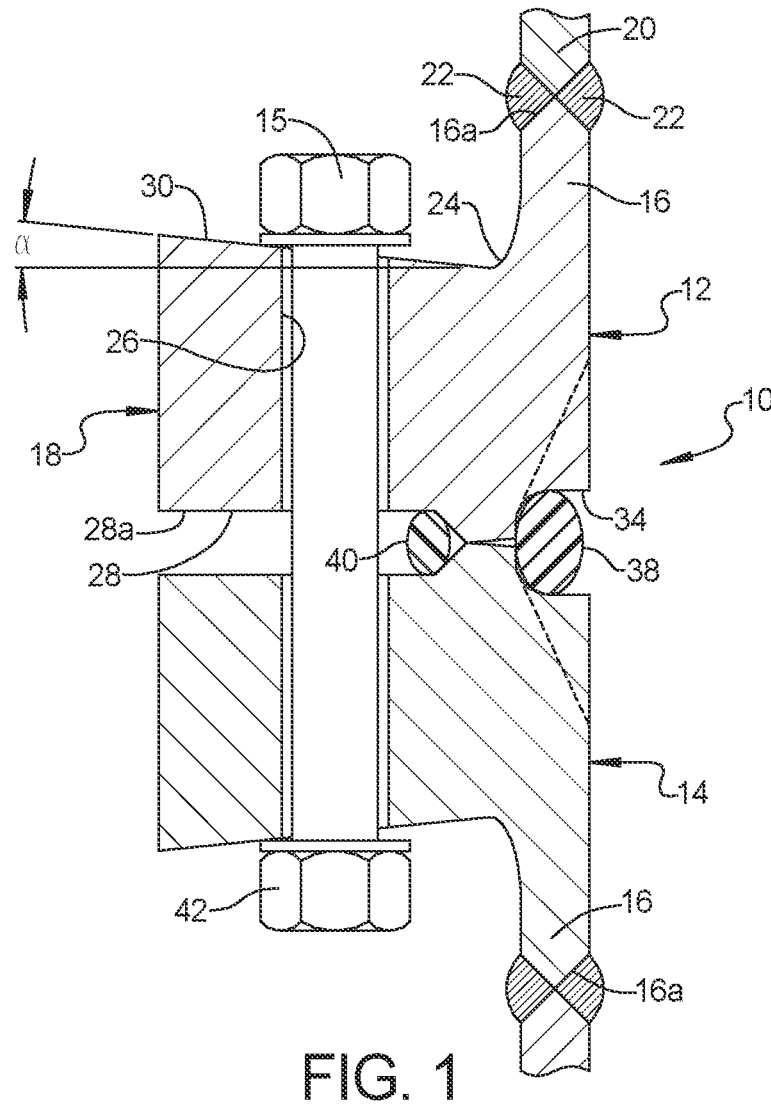
FIG. 1 is a cross-sectional view of a flange connection according to the principles of the present disclosure.
Figure 2:
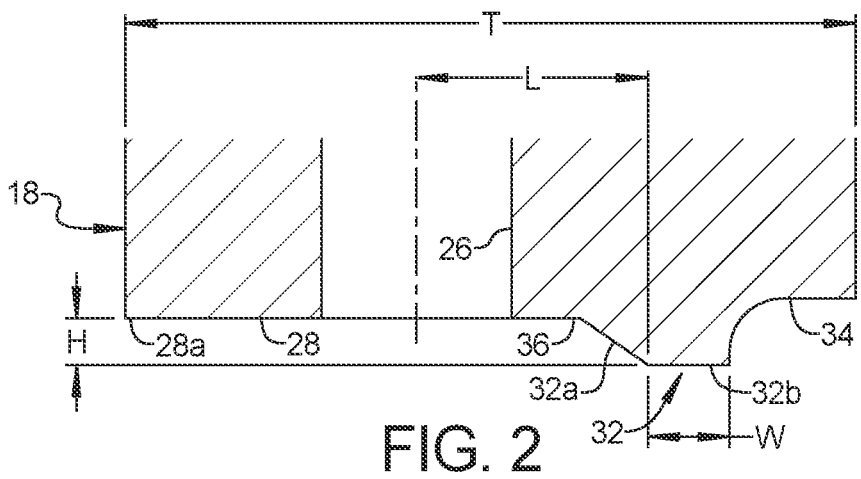
FIG. 2 is a schematic view of a portion of a flange member according to the principles of the present disclosure shown in an un-deformed state.
Figure 6:
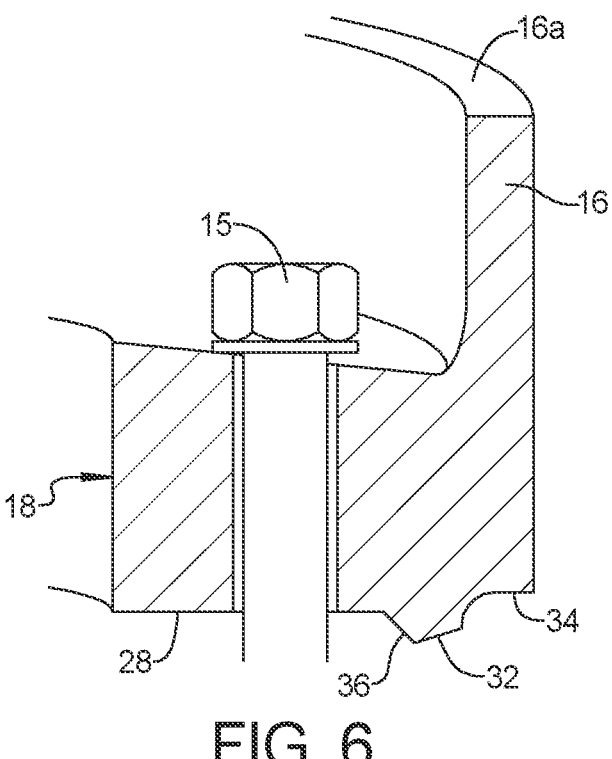
FIG. 6 is a schematic view of a partial cut-away perspective view of a flange member with the flange on an inner surface thereof.
Figure 7:
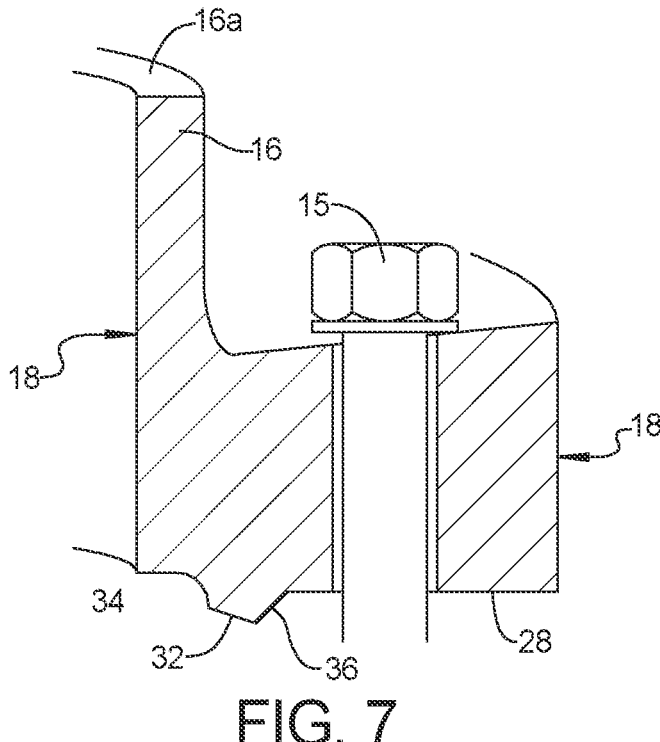
FIG. 7 is a schematic view of a partial cut-away perspective view of a flange member with the flange on an outer surface thereof.

With reference to FIG. 1, a flange connection system 10 will now be described. The flange connection system 10 includes a first flange ring 12 connected to a second flange ring 14 by a plurality of bolts 15. The flange rings 12, 14 are made from metal and each include an annular body having a neck portion 16 and a radially extending flange portion 18 extending from the neck portion 16. The flange portion 18 can extend radially inwardly from the annular neck portion 16, as shown in FIG. 6, or can extend radially outwardly from the annular neck portion 16, as shown in FIG. 7.

The neck portion 16 can be cylindrical in shape and can include an end portion 16a that can be configured to be connected to, for example, a wind turbine tower section 20 by welds 22. The neck portion 16 transitions to the flange portion 18 with a curved transition 24 that can have a round or elliptical or other high order type profile.

Figure 3:
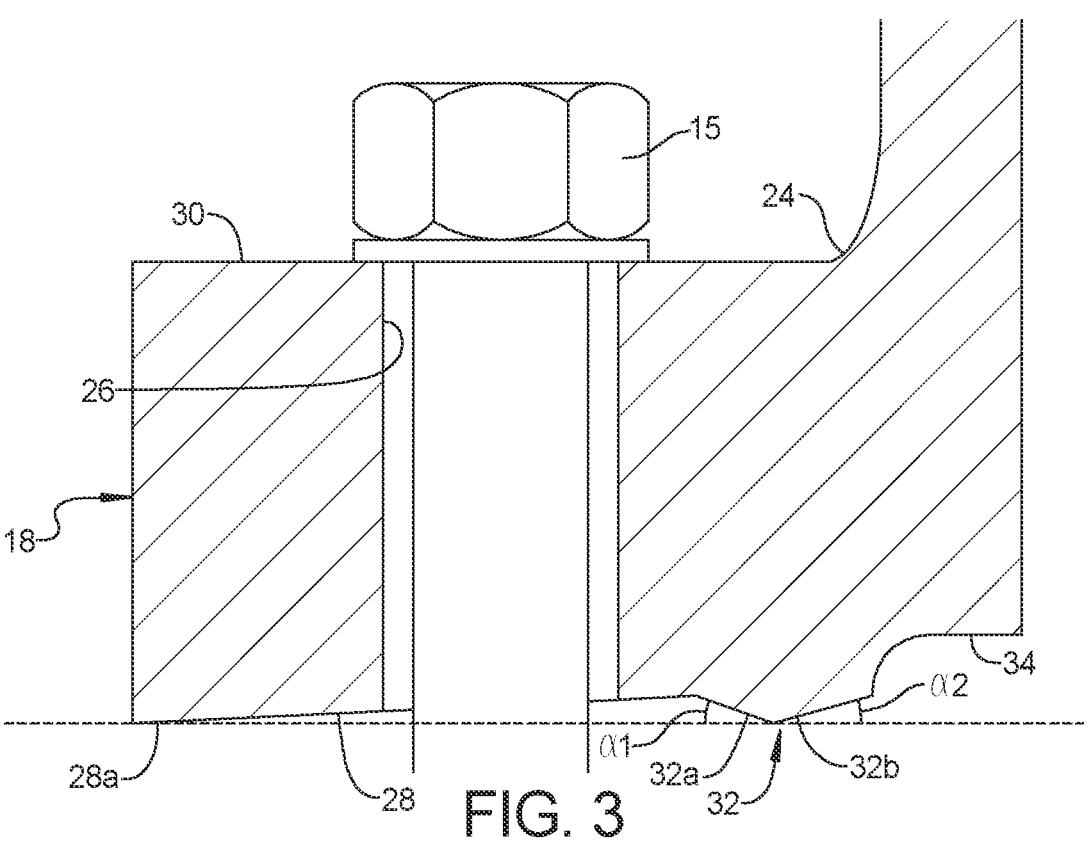
FIG. 3 is a schematic view of a portion of a flange member according to the principles of the present disclosure shown in a deformed mounted state.

The flange portion 18 includes a plurality of circumferentially spaced bolt holes 26 that extend parallel to an axis of the flange ring 12. The flange portion includes a distal face 28 facing in a direction axially away from the the neck portion 16 and a proximal face 30 that faces in a direction axially toward the neck portion 16. The distal face 28 includes a stepped annular contact surface 32 that protrudes axially from a remainder of the distal face 28. The stepped contact surface 32 can be defined by two angled surfaces 32a, 32b and the height H. The first surface 32a can be angled $\alpha 1$ from 0 to 90 deg and the second surface 32b can be angled $\alpha 2$ from −5 to 5 deg as seen in FIG. 3 but different in value from each other. For example if the first surface 32a is 90 deg and the second surface 32b is 0 deg it creates the embodiment of FIG. 4. The angled surfaces 232a, 232b can also be blended by a radius 232c, as shown in FIG. 5. The stepped contact surface 32 protrudes from the distal face by a distance H which is dependent upon the flange stiffness and the particular distance between the bolt holes 26 and the stepped contact surface 32. The annular contact surface 32 has a width W in a radial direction of between 10 and 100% of a distance between an outer edge of the bolt holes 26 and the outer diameter of the flange 12, 14. The radial thickness T of the flange ring 12, 14 is dependent upon the specific application The lever arm distance L can be measured from a center of the contact surface 32 to a center of the bolt holes 26 and is dependent upon other flange ring parameters. A first annular seal pocket 34 is provided radially outward of the contact surface 32 and a second annular seal pocket 36 is provided radially inward of the stepped contact surface 32.

In an assembled condition, as shown in pre-tension in FIG. 1, the contact surface 32 of the first flange ring 12 and the second flange ring 14 engage one another with a first seal ring 38 disposed in the first annular seal pocket 34 and a second seal ring 40 disposed in the second annular seal pocket 36. The first and second seal ring 38, 40 can be made from an elastomeric material, although other materials such as metal can be used. In the case when a metal seal ring is used in any pocket it can help guide the flanges into proper position during the assembly. The metal seal ring can also enhance the shear capacity of the connection on the face plane, which is already assured by the friction and high contact forces on the step. The bolts 15 are inserted through the bolt holes and a nut 42 is tightened onto the bolts 15 to deform the flange portions 18 together so that an outer perimeter edge 28a of the distal face 28 engage one another (See FIG. 3). The contact surfaces 32 serve as a lever for deforming the flange portions 18. The tightening forces are increased through the stepped contact surfaces 32 so that a static connection is obtained with at least 50% and up to 100% of the bolt force value goes through the contact surfaces 32 and the remaining forces are at the outer perimeter edge 28a. As shown in FIG. 1, the proximal face 30 has an inclined surface (at an angle α of between 0.1 and 10.0 degrees) in an un-deformed state and which in a deformed, assembled state as shown in FIG. 3 becomes generally planar. In the assembled condition, the first and second seals 38, 40 are compressed within the first and second annular seal pockets 34, 36.

Figure 4:
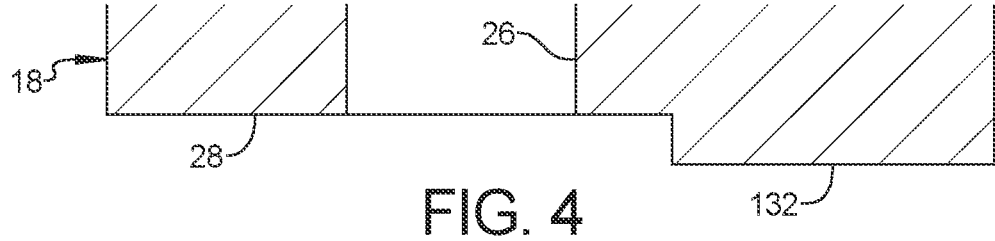
FIG. 4 is a schematic view of a portion of a flange member according to an alternative embodiment.
Figure 5:
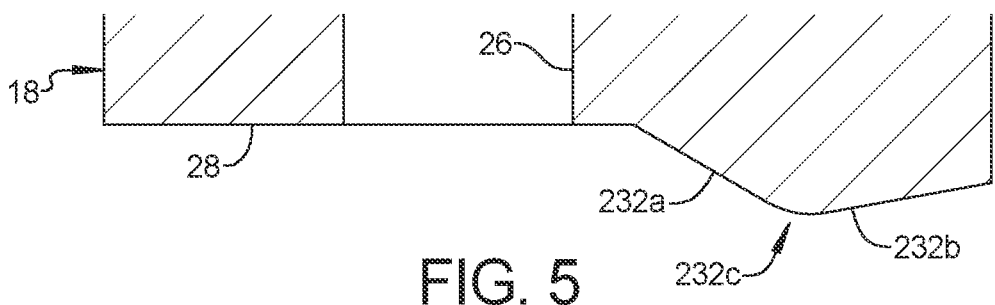
FIG. 5 is a schematic view of a portion of a flange member according to an alternative embodiment.

As shown in FIG. 4, the first seal pocket can be eliminated and the stepped contact surface 132 can extend to the edge equivalent with the neck portion 16. As a further alternative as shown in FIG. 5, the contact surface can be formed as a radiused surface 232c with angled surfaces 232a, 232b radially inward and outward thereof.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A flange connection system, comprising:
   a first flange ring and a second flange ring each including a neck portion and a radially extending flange portion,
   each radially extending flange portion including a proximal face facing in a direction of its respective neck portion and a distal face facing in a direction opposite to its respective neck portion, wherein in an undeformed state, the proximal face has an inclined surface at an angle of between 0.1 and 10.0 degrees relative to a plane that perpendicularly intersects a center axis of the neck portion, each distal face including a contact surface that axially protrudes relative to an entire remainder of the distal face of its respective radially extending flange portion, each radially extending flange portion including a plurality of circumferentially spaced bolt holes extending parallel to the center axes of the neck portions, each distal face including a first seal pocket radially inward of its respective contact surface and a second seal pocket radially outward of its respective contact surface, wherein in the undeformed state, a portion of the distal face radial outward from the contact surface is perpendicular to the center axes of the neck portions, wherein each contact surface is disposed entirely between its respective first seal pocket and its respective second seal pocket, wherein in an assembled condition, the contact surface of the first flange ring is disposed against the contact surface of the second flange ring, a first seal ring is disposed in each of the first seal pockets, a second seal ring is disposed in each of the second seal pockets and a plurality of bolt assemblies are inserted through the plurality of bolt holes and in the assembled condition, the bolt assemblies are tightened to bring edge portions of each radially extending flange portion in contact with one another such that the portions of each distal face radial outward from its contact surface are angled relative to the plane that perpendicularly intersects the center axis of its neck portion and the inclined surface of each proximal face extends perpendicular to the center axes of the neck portions, and to compress the first seal ring and the second seal ring.

2. The flange connection according to claim 1, wherein each radially extending flange portion extends radially outward from its respective neck portion.

3. The flange connection according to claim 2, wherein each first seal pocket and each second seal pocket are disposed radially inward of the bolt holes on their respective radially extending flange.

4. The flange connection according to claim 1, wherein each neck portion is configured to be welded to a tower section of a windmill.

5. A flange connection system, comprising:

a first flange ring and a second flange ring each including a neck portion and a radially extending flange portion, each radially extending flange portion including a proximal face facing in a direction of its respective neck portion and a distal face facing in a direction opposite to its respective neck portion, each distal face including a pointed annular contact surface, the pointed annular contact surface including angled first and second surfaces that are angled relative to a plane that perpendicularly intersects a center axis, the first and second surfaces axially protrude relative to an entire remainder of the distal face of its respective radially extending flange portion and the angled first and second surfaces of the pointed annular contact surface are at an acute angle relative to a plane that perpendicularly intersects the center axis and the angled first and second surfaces intersect one another to define a pointed edge contact surface, each radially extending flange portion including a plurality of circumferentially spaced bolt holes extending parallel to the center axis, wherein each pointed annular contact surface is spaced radially inward from the plurality of circumferentially spaced bolt holes, wherein in an assembled condition, the pointed annular contact surface of the first flange ring is disposed against the pointed annular contact surface of the second flange ring; and a plurality of bolt assemblies are inserted through the plurality of bolt holes and tightened to bring edge portions of each radially extending flange portion in contact with one another.

6. The flange connection according to claim 5, wherein each radially extending flange portion extends radially outward from its respective neck portion.

7. The flange connection according to claim 6, wherein a first seal pocket and a second seal pocket are disposed radially inward of the bolt holes.

* * * * *